United States Patent Office 2,974,088
Patented Mar. 7, 1961

2,974,088
METHOD OF PREPARING GROWTH HORMONE

Urban J. Lewis, Scotch Plains, and Norman G. Brink, Westfield, N.J., assignors to Merck & Co., Inc., Rahway, N.J., a corporation of New Jersey No Drawing. Filed July 18, 1958, Ser. No. 749,326

2 Claims. (Cl. 167—74)

This invention relates to the hormone obtained from pituitary glands known as the growth hormone, and to procedures for obtaining it in crystalline form.

The growth hormone obtained from pituitary glands is of considerable interest and importance because of its ability to stimulate anabolic reactions in the animal body, such as protein synthesis.

It is an object of the invention to provide processes for the isolation of growth hormone in crystalline form. Another object is to provide the growth hormone in pure or substantially pure form free from any contaminating substances. Other objects will be apparent from the detailed description of our invention hereinafter provided.

In accordance with the present invention, it is now found that the growth hormone can be obtained in crystalline form from human pituitary glands by procedures comprising (1) extraction of the fresh glands with acetone, (2) extraction of the acetone residue with aqueous salt solutions, (3) precipitation from aqueous salt solutions by the addition of suitable miscible organic solvents at alkaline and acid pH, and finally crystallization from aqueous salt solutions by the addition of suitable miscible organic solvents.

In the first step of our process fresh, human pituitary glands are homogenized in any convenient homogenizer such as a Waring Blendor, with from 0.5 to 5 times their weight of cold acetone for from 3 to 10 minutes. The homogenate is then poured into an amount of chilled acetone equivalent to from 5 to 20 times the original weight of the glands. The mixture is stirred for a short time and the insoluble portion is recovered. After a repetition of this acetone extraction, the recovered solids are air dried and are used as the starting material for the further steps of our process. This material is referred to as the acetone powder.

In carrying out this acetone extraction, it is necessary that this process be carried out at a temperature below about −5° C. Generally, we prefer to carry out the extraction at a temperature of −20° C. since this affords maximum yields of the desired acetone powder.

In the second step of our process, the acetone powder is extracted with from 15 to 40 times its weight of a neutral salt solution such as potassium chloride, sodium chloride, sodium sulfate, and the like; the molarity of the salt solution being between 0.1 and 1 molar. The neutral salt solution employed for this extraction is adjusted to a pH between about 4 and 7. After separation of the insoluble portion, the insoluble portion is further extracted with an additional quantity of the neutral salt solution, and this extract is added to the original extract. By electrophoretic analysis this extract contains between 60 and 70% growth hormone.

In the next step of our process, the solution obtained by extracting the acetone powder is mixed with a sufficient quantity of a suitable miscible organic solvent, such as ethanol or acetone, to make the final solution about 5–15% solvent. In carrying out this step it is important that the addition be done slowly, any precipitate formed during the addition being removed and discarded. The concentration of the organic solvent is then brought to 25 to 40% by the further slow addition of the miscible organic solvent. The resulting precipitate is removed, as for example, by filtration or centrifugation and dried under vacuum, preferably by lyophilization. The pH of the solvent layer is then adjusted to 4.5 to 6.5 with dilute acid which again causes the precipitation of active material. This precipitate is then recovered as described above and the two precipitated residues are combined for further purification in accordance with the next step of our process. This precipitate contains from 80–90% growth hormone.

In this step of our process the precipitates are again dissolved in a neutral salt solution, such as potassium chloride, sodium chloride, sodium sulfate and the like having a molarity between about 0.05 M and 0.5 M, and the mixture stirred for sufficient time to insure complete extraction of the residue. For every gram of precipitate employed in the process, about 100 to 500 ml. of the neutral salt solution adjusted to a pH between 9 and 11 is employed. Any insoluble material is then removed from the solution and the pH of the resulting extract is adjusted to between about 4 and 6. This causes precipitation of an additional residue which is removed and which contains considerable growth hormone. This material is readily purified to pure growth hormone by chromatography and crystallization described below. The extract so obtained is used in the following step of our process for preparing the growth hormone in crystalline form.

In the crystallization step of our process the extract obtained as described above containing the growth hormone in a purity of at least 80% is adjusted to a pH of 7 to 9, and to this solution is added sufficient organic solvent such as ethanol or acetone to make the solution from 20 to 35% solvent. This addition is made slowly with stirring at a rate of between 10 to 50 ml. per hour. During this addition crystallization of the growth hormone occurs and the crystalline growth hormone so obtained can be removed and recovered from the resulting solution. In certain cases this first crop of crystals still contains another component which can be removed by chromatography described below. The crystallization of the mother liquors yields material which is essentially pure growth hormones.

In the second, third and fourth steps of our process described above, all of the procedures are preferably carried out at a temperature between 0° C. and 10° C., preferably at about 4° C.

Alternatively, and in accordance with a further embodiment of this invention it is found that substantially pure growth hormones can be obtained from the various crude extracts described above by chromatography over diethylaminoethyl cellulose, hereinafter also called DEAE-cellulose. In this process the various crude extracts obtained in the foregoing described steps may be applied directly to the column, thus eliminating the organic solvent fractionation. Usually a second column run is needed to obtain the pure hormone.

The sample to be chromatographed is dissolved in a minimum of an alkaline buffer such as carbonate, glycinate, phosphate, of a pH value of between 8 and 11 and of an ionic strength of between 0.001 and 0.05. The solution next dialyzed against sufficient buffer to make certain no high concentration of residual salt is left in the sample.

The DEAE-(diethylaminoethyl)-cellulose column is prepared by equilibrating this ion-exchanger with the same buffer as used to dissolve the sample. Once equilibrated the exchanger is poured into the column as a slurry and packed with the aid of air pressure. For every 100 mg. of sample to be chromatographed, from 2 to 10 grams of exchanger is used.

The sample is applied and driven into the column with fresh buffer. This same buffer is allowed to run through until no more protein, if any, is eluted as judged by adsorption at 280 mµ. The flow rate is between 30 and 90 ml. per hour and 10–30 minute fractions are collected. Once the ultraviolet absorption of the fractions has dropped to a negligible value, the ionic strength of the buffer is increased by addition of a neutral salt, such as NaCl, KCl, $Na_2SO_4$, to the alkaline buffer. The addition of neutral salt may be done by development of a salt gradient or it may be done stepwise. As the salt concentration increases, the various proteins on the column are eluted and collected. Ultraviolet absorption at 280 mµ is used to locate the protein. Once a fraction is collected it is dialyzed free of salt and dried under a vacuum as by lyophilization. The presence of growth hormone is then detected by having the samples assayed. Usually the hormone is eluted between a salt concentration of 0.1–0.2 N.

The growth hormones containing fractions are then dried by evaporating under vacuum, for example, lyophilization to obtain the product in substantially pure form. In cases where a crude extract has been applied to the column, a second, smaller column is needed to obtain essentially pure growth hormone. This material can then be obtained in pure crystalline form by the crystallization process described above.

The following examples illustrate the various procedures of our invention:

*Example 1*

180 human pituitary glands weighing 80 g. were homogenized for three minutes with 200 ml. of acetone. All processes were done at —20°. The homogenate was poured into 600 ml. of acetone, stirred and then filtered through paper on a Büchner funnel. The filtrate was discarded. The filter cake was again homogenized for one minute in 800 ml. of acetone and then filtered. The filtrate was discarded. The cake, herein called the acetone powder, was finally air dried at room temperature. The yield was 14.2 g.

*Example 2*

14.2 g. of acetone powder, prepared as described in Example 1, was stirred for one hour with 275 ml. of 0.3 M KCl. All work was done at 4° C. The pH of the mixture was adjusted to pH 5.5 with 4 M HCl and maintained at this pH during the one hour stirring.

After stirring, the mixture was centrifuged to sediment the insoluble material. The supernatant was poured off and set aside. The precipitate was suspended in 137 ml. of 0.3 M KCl, the pH adjusted to 5, and stirred for one hour. The mixture was then centrifuged as before and the supernatant was combined with the first. The residue was saved for an alkaline extraction (see Example 8).

The combined supernatants termed the crude pH 5.5 extract, were adjusted to pH 8.5 with 1 N KOH. The volume was 390 ml. 97 ml. of this solution was removed and lyophilized. It was further processed as described in Example 5. The yield was 1.0 gm.

To the remaining 293 ml. of solution, 135 ml. of 95% ethanol was added to bring the ethanol concentration to 30%. Addition was done at a rate of 60 ml. per hour and with mechanical stirring. The resulting precipitate was removed by centrifugation, suspended in water and lyophilized. Yield was 500 mg. This precipitate is termed the 30% precipitate. The supernatant fluid from this precipitate was adjusted to pH 6.1 with 4 M HCl. The resulting precipitate was removed by centrifugation, suspended in water and lyophilized. The yield was 1.0 gm. This was termed the acid 30% precipitate.

The 30% ethanol supernatant from the acid precipitate was dialyzed against water until free of salt and then lyophilized. Yield was 1.3 gm. This material contained some growth hormone. A similar fraction was further processed as described in Example 6.

The 30% precipitate and the acid 30% precipitate were combined and crystallized as described in Example 3.

*Example 3*

The 1.5 gm. of combined precipitate obtained in Example 2 was stirred for one hour with 105 ml. of 0.1 M KCl. The pH was adjusted to pH 11 during the stirring. The mixture was next centrifuged to sediment the insoluble material. The precipitate (termed the pH 11 insoluble) was set aside. The supernatant fluid was adjusted to pH 4.8 with 4 M HCl. The mixture was then centrifuged as before. The supernatant solution was set aside. The precipitate was taken up in 53 ml. of 0.1 M KCl at pH 11, stirred for one hour and centrifuged. The precipitate was combined with the first pH 11 insolubles and the combined material was suspended in water and lyophilized. This contained only a small amount of growth hormone. The supernatant solution was made to pH 4.8 with 4 M HCl and the resulting precipitate was removed by centrifugation, suspended in water and lyophilized. This precipitate contained some residual growth hormone. Similar material was further processed as described in Example 7. This material is termed the pH 4.8 precipitate. The supernatant solution from this pH 4.8 precipitation was combined with the first pH 4.8 supernatant obtained above. The combined supernatants were next adjusted to pH 7.5 with 1 M KOH. The volume of the solution was 153 ml. To this solution, 111 ml. of 47.5% ethanol (v./v.) was added dropwise with stirring. The rate was 30 ml. per hour.

During the ethanol addition, crystallization of growth hormone took place. When the ethanol had been added, the crystals were removed by centrifugation, suspended in water and lyophilized. The yield was 93 mg.

The mother liquors were dialyzed against running water until salt-free and then lyophilized. Yield was 300 mg. Another batch of crystalline growth hormone can be obtained from this material by the method described in Example 4.

*Example 4*

50 mg. of mother liquor material obtained after the first crystallization process described in Example 3 were dissolved in 10 ml. of pH 10 sodium carbonate buffer, 0.1Γ/2. A small amount of insoluble material was removed by centrifugation and discarded. The clear supernatant fluid was adjusted to pH 7.5 with 1 M HCl. All work was carried out at 4° C.

To this solution 47.5% ethanol (v./v.) was added dropwise with stirring to bring the ethanol concentration to 25%. Crystals of growth hormone formed during the ethanol addition. These crystals were removed by centrifugation, suspended in water and lyophilized. Yield was 37 mg.

The mother liquors were dialyzed against water overnight and then lyophilized. This material was recombined with more mother liquor material to await crystallization.

*Example 5*

The process of steps of Examples 1 and 2 was carried out up to the addition of ethanol described in Example 2. 97 ml. of the crude pH 5.5 extract which had been adjusted to pH 8.5 was used as starting material for chromatographic separation of the growth hormone.

Approximately 75 g. of DEAE (diethylaminoethyl) cellulose was equilibrated with pH 10, 0.02Γ/2 sodium carbonate buffer. The equilibrated material, termed the ion exchanger, was used to pack a chromatographic column 3.5 cm. x 30 cm. in dimensions.

The 1.0 gm. of starting material, which had been equilibrated by dialysis with the same carbonate buffer, was then applied to the column. The flow rate was adjusted to 1 ml./min. and 20 min. fractions were collected.

Once the sample had entered the column, the same pH 10 buffer was run through the column for 25 fractions. At fraction 26, the eluant entering the column was changed to the same pH 10 buffer containing 0.1 M NaCl. This eluant was used through fraction 62. At fraction 63 the eluant was changed to the same pH 10 buffer containing 0.2 M NaCl. This was used through fraction 128. At fraction 129 the eluant was changed to the pH 10 buffer containing 0.5 M NaCl. This was passed through the column until fraction 149 had been collected.

The optical density of each fraction was determined at 280 m$\mu$. Wherever protein was eluted as a peak, the fractions were combined, dialyzed overnight against water and then lyophilized.

Two major and two minor components were eluted from the column. The first major peak eluted (fractions 33–60) contained the major portion of the growth hormone and was 80% pure. To be completely purified a rerun on a smaller column would be necessary.

*Example 6*

The process steps of Examples 1 and 2 were carried out so as to obtain the 30% ethanol supernatant described at the end of Example 2.

600 mg. of a lyophilized sample of the 30% ethanol supernatant was used as starting material for chromatographic separation of the growth hormone.

The DEAE-cellulose column was prepared as described in Example 5. The sample was dissolved in the same pH 10 buffer and prepared and applied to the column as described in Example 5. The same flow rate and fraction volume was used.

The pH 10 buffer was then passed through the column for 24 fractions. The eluant was then changed to the same pH 10 buffer containing 0.1 M NaCl. This was used through fraction 77. At fraction 78 the eluant was changed to the same pH 10 buffer containing 0.2 M NaCl. This was passed through the column until fraction 139. At fraction 140 the eluant was changed to the same pH 10 buffer containing 0.5 M NaCl used through fraction 193.

The optical density of each fraction was determined at 280 m$\mu$. The peak fractions were combined dialyzed against water overnight and lyophilized.

Two major peaks and three minor ones were obtained. The growth hormone activity was in the second major peak (fractions 91–110). The yield was 600 mg.

*Example 7*

The process steps of Examples 1, 2, and 3 were carried out up to the collection of the pH 4.8 precipitate in Example 3.

1.3 g. of a lyophilized preparation of the 4.8 precipitate was dissolved in about 25 ml. of the pH 10 buffer described in Example 5 and prepared for chromatography as described in Example 5.

The DEAE-cellulose column was prepared as described in Example 5. The sample was applied to the column, also as described in Example 5, and a flow rate of 1 ml./min. with 20 min. fractions was used.

The same pH 10 buffer was passed through the column to fraction 65. At tube 65 the eluant was changed to the same pH 10 buffer containing 0.1 M NaCl. This was run through the column to fraction 138. At fraction 138 the eluant was changed to the pH 10 buffer containing 0.2 M NaCl. This was used until fraction 210 when the eluant was changed to the pH 10 buffer containing 0.5 M NaCl. This was applied through fraction 240.

The optical density of each fraction was determined at 280 m$\mu$ and the fractions were combined, dialyzed against water overnight and lyophilized.

The growth hormone was found to be in fractions 74–110. The yield was 864 mg.

*Example 8*

The process steps of Examples 1 and 2 were carried out up to the collection of the acid-buffer extracted residue. This material was then extracted with an alkaline buffer to yield additional growth hormone.

The moist residue from the pH 5.5 extraction was suspended in 275 ml. of 0.3 N KCl at pH 11 and then stirred for 3 hours. The mixture was then centrifuged to sediment the insoluble material. The clear supernatant was then poured off and set aside. The precipitate was suspended in 135 ml. of 0.3 M KCl, pH 11 and stirred for 1 hour. The mixture was centrifuged as before. The residue was saved but not used for growth hermone isolation. The clear supernatant fluid was combined with the first and the pH was adjusted to pH 8.5 with 4 M HCl. The volume was 420 ml.

This material contains appreciable amounts of growth hormone and can be further purified by the process steps described in Examples 2, 3, and 4 or Example 5.

*Example 9*

The crystalline growth hormone obtained by the process steps described in the above examples has the following physical-chemical properties:

(1) A single boundary in electrophoresis at pH 10 and pH 5.

(2) A single boundary in ultracentrifugation.

(3) An electrophoretic mobility of $-4.7 \times 10^{-5}$ cm.$^2$/sec./volt at pH 10 and $+3.4 \times 10^{-5}$ cm.$^2$/sec./volt at pH 4.

(4) A sedimentation constant of 2.4 S.

Growth hormone possesses the ability to stimulate the anabolic reactions in the animal body, such as protein synthesis. Because of this, growth hormone would be of use in treatment of any wasting disease, such as liver damage, where the patient is in negative nitrogen balance. It would also be useful in shortening the convalescence period of elderly postoperative cases since the hormone would stimulate healing. Beside wound healing, growth hormone could be used in severe burn cases to minimize nitrogen loss and help protein synthesis. Growth hormone can be used in treatment of juvenile pituitary insufficiency or in any case where hypophysectomy has been performed. The hormone must be of high purity to minimize any deleterious effects of contaminating substances.

It has been noted that during the ordinary laboratory manipulations of growth hormone, the electrophoresis patterns of the preparations became asymmetrical even though no definite separation of components occurred. Upon long standing in solution, as during column chromatography, the skewed appearance was accentuated. While these results indicate alteration of the protein, no change in biological activity has been noted as a result of this alteration.

Therefore, it is concluded that the growth hormone preparations exhibiting asymmetry during electrophoresis are composed of only growth hormone and that some of the hormone has been slightly altered to impart a different electric charge on the molecule while leaving the biological activity intact.

Various changes and modifications of the invention can be made and, to the extent that such variations incorporate the spirit of this invention, they are intended to be included within the scope of the appended claims.

What is claimed is:

1. The process for recovering human growth hormone in crystalline form which comprises the following steps:

(a) extracting human pituitary glands with acetone at a temperature below about $-5°$ C. and separating and drying the resulting insoluble portion, (b) extracting this insoluble portion with a 0.3 M water solution of potassium chloride at a pH of about 5.5 and separating the resulting precipitate, (c) adjusting the pH of the separated extract to about 8.5 with 1 N potassium hydroxide slowly adding sufficient ethanol to bring the ethanol concentration to about 30%, and separating and drying the resulting precipitate, (d) adjusting the ethanol extract to about pH 6.1 with 4 N hydrochloric acid and separating and drying the resulting precipitate, (e) extracting the combined precipitates of (c) and (d) with a 0.1 N solution of potassium chloride at pH 11 and separating the resulting precipitate, (f) adjusting the pH of the resulting extract from (e) to pH 4.8 with 4 N hydrochloric acid and separating the resulting precipitate, (g) adjusting the extract from (f) to a pH of about 7.5 with 1 N potassium hydroxide, slowly adding ethanol in an amount sufficient to bring the concentration of ethanol to about 15%, and recovering and drying the crystalline growth factor precipitated; all of said steps (a)–(g) being carried out at a temperature below about 10° C.

2. The process for the preparation of human pituitary gland growth hormone in crystalline form which comprises slowly adding ethanol to a solution of growth hormone having a purity of at least 80% in a potassium chloride aqueous solution at about pH 7.5, said ethanol being added in an amount sufficient to make the solution about 30% ethanol, and recovering crystalline growth factor from the resulting solution.

References Cited in the file of this patent

Li: Science, vol. 124, No. 3235, Dec. 28, 1956, pp. 1293, 1294.

Guthrie: Ind. and Eng. Chem., vol. 43, September 1952, pp. 2187–2189.

Pincus: The Hormones, vol. I, 1948, Academic Press, N.Y.C., pp. 676 and 677.

Pincus: The Hormones, vol. III, 1955, Academic Press, N.Y.C., 202–205.